(12) United States Patent
Loeb

(10) Patent No.: US 11,789,846 B2
(45) Date of Patent: Oct. 17, 2023

(54) METHOD AND SYSTEM FOR USING STACKTRACE SIGNATURES FOR BUG TRIAGING IN A MICROSERVICE ARCHITECTURE

(71) Applicant: Sony Interactive Entertainment LLC, San Mateo, CA (US)

(72) Inventor: Jessica Loeb, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 241 days.

(21) Appl. No.: 17/163,890

(22) Filed: Feb. 1, 2021

(65) Prior Publication Data
US 2022/0245131 A1    Aug. 4, 2022

(51) Int. Cl.
*G06F 11/00* (2006.01)
*G06F 11/36* (2006.01)
*A63F 13/792* (2014.01)
*G06N 20/00* (2019.01)

(52) U.S. Cl.
CPC .......... *G06F 11/364* (2013.01); *A63F 13/792* (2014.09); *G06N 20/00* (2019.01)

(58) Field of Classification Search
CPC ... G06F 11/364; G06F 11/3636; A63F 13/792
See application file for complete search history.

(56) References Cited

U.S. PATENT DOCUMENTS

| | | | |
|---|---|---|---|
| 7,877,641 B2 * | 1/2011 | Elliott | G06F 11/0766 714/33 |
| 2021/0026646 A1 * | 1/2021 | Jha | G06F 9/3891 |
| 2021/0133015 A1 * | 5/2021 | Agarwal | G06F 11/36 |

OTHER PUBLICATIONS

Zhao, Xu et al., Iprof: A Non-intrusive Request Flow Profiler for Distributed Systems, Oct. 6-8, 2014, USENIX (Year: 2014).*

* cited by examiner

*Primary Examiner* — Marc Duncan
(74) *Attorney, Agent, or Firm* — PENILLA IP, APC

(57) ABSTRACT

A method is disclosed. The method including receiving at a telemetry service a plurality of transaction responses from a plurality of components distributed across a network, wherein the plurality of transaction responses is generated to process a request originating from a source component, wherein the request includes a request identifier, wherein the plurality of transaction responses includes a plurality of code path identifiers. The method including generating a fingerprint associated with the request by concatenating the plurality of code path identifiers, wherein each transaction response includes the request identifier and a corresponding code path identifier. The method including storing the fingerprint in a data storage.

20 Claims, 7 Drawing Sheets

300

Receiving at a telemetry service a plurality of transaction responses from a plurality of components distributed across a network, wherein the plurality of transaction responses is generated to process a request originating from a source component, wherein the request includes a request identifier, wherein the plurality of transaction responses includes a plurality of code path identifiers — 310

Generating a fingerprint associated with the request by concatenating the plurality of code path identifiers, wherein each transaction response includes the request identifier and a corresponding code path identifier — 320

Storing the fingerprint in a data storage — 330

METHOD AND SYSTEM FOR USING STACKTRACE SIGNATURES FOR BUG TRIAGING IN A MICROSERVICE ARCHITECTURE

TECHNICAL FIELD

The present disclosure is related to microservice architectures, and more specifically to generating code-path identifiers and/or stacktrace signatures corresponding to code paths for each microservice used when responding to a request, wherein the identifiers and signatures are used to generate a fingerprint that further can be used to triage complex system integration issues.

BACKGROUND OF THE DISCLOSURE

A microservices architecture provides for a large-scale, service-oriented application to be implemented across multiple independent microservices through a communication network, wherein the microservices communicate with each other through application programming interfaces (APIs).

Previously, a software based service was typically implemented in a monolithic architecture where the processes supporting the software based service were configured as a single service. For purposes of illustration, this could be thought of as one piece of code or executing the processes that support the software based service. Because the processes are intertwined (e.g., throughout the code), a change to one process affects other processes, making modifications to the code for the software based service more and more complex, especially as the code gets larger and larger. In addition, handling increased demand for one process with resources also requires increased resources for the other processes in the monolithic architecture. That is, scaling one part of the monolithic architecture requires the same scaling throughout the monolithic architecture. Further, when one part of the monolithic architecture fails, this results in failure across the entire architecture.

On the other hand, a microservices architecture is configured using multiple microservices, each microservice implementing a single process or function that is lightweight. The microservices communicate with each other using APIs thereby in combination providing the functionality of the large-scale, service-oriented application. Each microservice is isolated from other microservices in that they can be independently developed, deployed, scaled, and updated without affecting other microservices. Further, each microservice can choose to use their own programming languages, hardware and software resources, databases, etc. In that manner, changes to the microservices architecture can be made at the microservice level using smaller and independent development and management teams.

However, there may be errors that are thrown within a microservice or when passing data between microservices, during implementation of a request that is handled by the microservices architecture. In particular, in microservice-heavy systems, it can be challenging to tie issues together across services, especially when development teams are distributed. For example, an error may get triggered anywhere within a chain of microservices dependencies, such as when hopping through two to four microservice dependencies before coming back to a client. The error may ultimately be reported generally or in mass with other errors without any context as to which microservice threw the error, especially when individual errors are not passed along from dependent microservices. As such, error reporting throughout a microservice architecture may be ineffective as to providing a remedy for that error.

It is in this context that embodiments of the disclosure arise.

SUMMARY

Embodiments of the present disclosure relate to systems and methods for grouping code paths of microservices that are used to support a request or demand for a service provided by an application. In that manner, issues or errors associated with the grouping of code paths may be discoverable and related, thereby providing a holistic remedy to the issues across all the microservices.

In one embodiment, a method for using stacktrace signatures in a microservice architecture is disclosed. The method including receiving at a telemetry service a plurality of transaction responses from a plurality of components distributed across a network. The plurality of transaction responses is generated to process a request originating from a source component, wherein the request includes a request identifier. The plurality of transaction responses includes a plurality of code path identifiers. The method including generating a fingerprint associated with the request by concatenating the plurality of code path identifiers. Each transaction response includes the request identifier and a corresponding code path identifier. The method including storing the fingerprint in a data storage.

In another embodiment, a non-transitory computer-readable medium storing a computer program for implementing a method for using stacktrace signatures in a microservice architecture is disclosed. The computer-readable medium including program instructions for receiving at a telemetry service a plurality of transaction responses from a plurality of components distributed across a network. The plurality of transaction responses is generated to process a request originating from a source component, wherein the request includes a request identifier. The plurality of transaction responses includes a plurality of code path identifiers. The computer-readable medium including program instructions for generating a fingerprint associated with the request by concatenating the plurality of code path identifiers. Each transaction response includes the request identifier and a corresponding code path identifier. The computer-readable medium including program instructions for storing the fingerprint in a data storage.

In still another embodiment, a computer system is disclosed, wherein the computer system includes a processor and memory coupled to the processor and having stored therein instructions that, if executed by the computer system, cause the computer system to execute a method for using stacktrace signatures in a microservice architecture is disclosed. The method including receiving at a telemetry service a plurality of transaction responses from a plurality of components distributed across a network. The plurality of transaction responses is generated to process a request originating from a source component, wherein the request includes a request identifier. The plurality of transaction responses includes a plurality of code path identifiers. The method including generating a fingerprint associated with the request by concatenating the plurality of code path identifiers. Each transaction response includes the request identifier and a corresponding code path identifier. The method including storing the fingerprint in a data storage.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
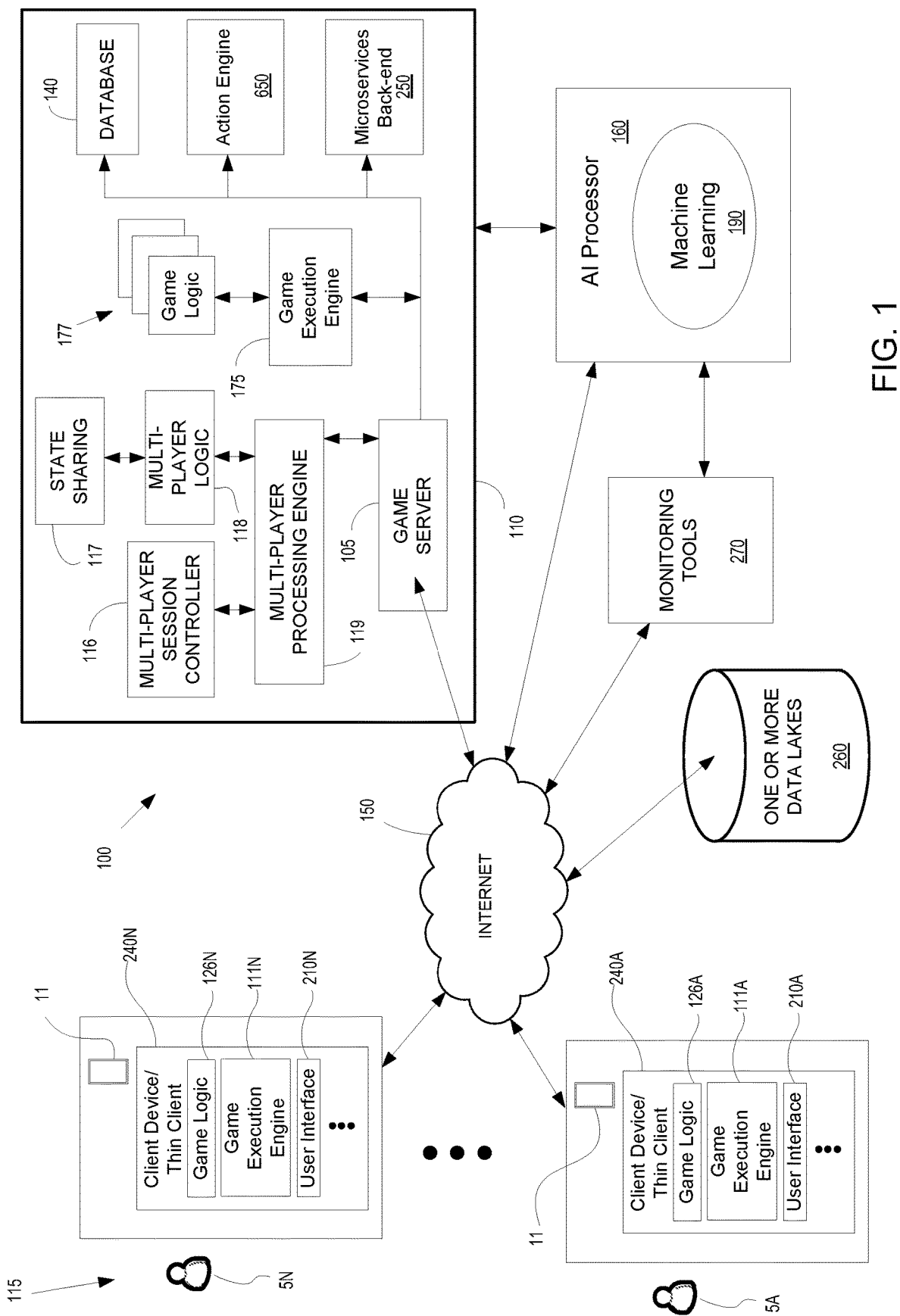
FIG. 1 illustrates a system configured for single-player and/or multi-player game plays of video games through client side systems or cloud based gaming systems, including application based services supporting the game plays and implemented through a microservices architecture, wherein a fingerprint of system interaction can be generated that is based on stacktrace signatures at each microservice, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods using stacktrace signatures for bug triaging in a microservices architecture. Within the boundaries of each service, application, microservice, and subsystem in the microservices architecture a unique identifier (ID) can deterministically be generated for each microservice version wherein the unique ID includes a stacktrace signature of the corresponding codepath. Deterministic generation could use any number of mechanisms, ranging in complexity from a string-based identifier using an MD5 hash, or a map with metadata as space/data constraints allow. This unique ID can be forwarded across microservices and used to provide a unique fingerprint for the system interaction, wherein the fingerprint includes stacktrace signatures or code-path identifiers that are related to code paths taken throughout the microservices architecture, such as when providing a service request. When the ultimate result is classified as an error or any negative event (e.g., error, undetermined status, warning, etc.), this fingerprint can be used to triage complex system integration issues. In particular, the code-path identifiers, each of which is unique to a corresponding microservice, captures context over a vast microservices architecture, wherein the code-path identifiers in a fingerprint allows for tying (i.e., connecting) one or more errors to specific subroutines within corresponding services, applications, microservices, and subsystems in the microservices architecture, especially when combined with service/API (application programming interface) versioning information. Further, artificial intelligence (AI) techniques can be used to train and/or build a machine learning model configured to identify and/or classify events, trends, and like occurring within the microservices architecture through analysis of fingerprints and/or information related to the fingerprints, and take appropriate action based on the classified and/or identified event, such as scaling resources, notifying developers, etc.

Advantages of a system configured to generate fingerprints based on stacktrace signatures and/or code-path identifiers include identifying the source (e.g., microservice) of an error and identifying the corresponding code paths and/or subroutines taken to generate that error, identifying the source of errors that are embedded within traversals across multiple microservice dependencies, performing code-path analysis within a microservices architecture, for relating issues (e.g., errors) together across microservices that are distributed through a microservices architecture, relating issues in microservices development for a microservices architecture especially as development teams are distributed throughout the world, and identifying positive and negative trends occurring within the microservices architecture using artificial intelligence and taking appropriate action based on those trends.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

While embodiments of the present disclosure are described within the context of executing and/or supporting single player and multi-player game play, such as when using application based services supporting the game plays and implemented through a microservices architecture, it is understood that a fingerprint of system interaction can be generated based on stacktrace signatures related to code paths taken through any microservices architecture supporting any application based service.

With the above general understanding of the various embodiments, example details of the embodiments will now be described with reference to the various drawings.

FIG. 1 illustrates a system 100 configured for single-player and/or multi-player game plays of video games through client side systems or cloud based gaming systems, including application based services supporting the game plays and implemented through a microservices architecture, wherein a fingerprint of system interaction can be generated that is based on stacktrace signatures at each microservice, such as when providing a service request for the application based services, in accordance with one embodiment of the present disclosure.

A video game may be executing locally to a corresponding player (without back-end support as a stand-alone system, or with back-end support for data transfer and storage or in a multi-player setting), or may be executing at a back-end server (e.g., through game cloud system 110), as will be described below. As shown, a plurality of players 115 (e.g., player 5A . . . player 5N) is playing a plurality of video games or gaming applications, wherein each of the video games is executed locally on a corresponding client device 240 (e.g., 240A-240N) (e.g., game console) of a corresponding user, or on a back-end server (e.g., game cloud system 110). The system 100 supports game play by the plurality of players 115 at one or more moments in time in single-player or multi-player modes, such as over a period of time. In addition, each of the plurality of players 115 has access to an optional device 11 or other device (e.g., speaker or head mounted display), configured to provide additional support (e.g., display, etc.) and/or features. Client device 240 can include any type of device having a processor and memory, wired or wireless, portable or not portable. In one embodiment, client device 240 can be in the form of a smartphone, a tablet computer, or hybrids that provide touch screen capability in a portable form factor.

For local execution of a corresponding video game, each of the client devices 240A-240N may be configured similarly in that local execution of a corresponding gaming application is performed. For example, player 5A may be playing a first video game on a corresponding client device 240A, wherein an instance of the first video game is executed by a corresponding game execution engine 111A (e.g., game engine) including a central processing unit (CPU) and graphics processing unit (GPU) group. Game logic 126A (e.g., executable code) implementing the first video game is stored on the corresponding client device 240A, and is used to execute the first video game using the game execution engine 111A. For purposes of illustration, game logic may be delivered to the corresponding client device 240A through a portable medium (e.g., flash drive, compact disk, etc.) or through a network (e.g., downloaded through the internet 150 from a gaming provider). Other players may be playing the same video game or other video games via respective client devices 240, as previously described. For example, player 115N is playing an Nth video game on a corresponding client device 240N, wherein an instance of the Nth video game is executed by a corresponding game execution engine 111N. The Nth video game may be identical to the first video game executing in association with the game play of player 5A, or may be a completely different video game. Game logic 126N (e.g., executable code) implementing the Nth video game is stored on the corresponding client device 240N as previously described, and is used to execute the Nth video game using a corresponding game execution engine 111N.

For remote execution of a corresponding video game, game cloud system 110 may be configured as a distributed game server system and/or architecture. For example, the client device of the user may be located at the game cloud system 110, wherein the user accesses the remote client device through a thin client that is local to the user. Generally speaking, game cloud system (GCS) 110 may be a cloud computing system operating over a network 150 to support a plurality of users/players. GCS 110 is a system that can provide gaming applications, services, gaming related digital content, and interconnectivity among systems, applications, users, and social networks. GCS 110 may communicate with client devices 240A-N and social media providers (not shown) through social media manager (not shown) via network interface (not shown). A social media manager (not shown) may be configured to relate one or more friends across one or more social media platforms. A gaming session manager (not shown) of the GCS 110 may communicate with a recording engine (not shown) to generate or save a recording (e.g., video) of game play or game play session, or gaming session.

User profiles for each player accessing the GCS 110 include player information that can be used for authentication purposes. For example, an account manager (not shown) may be used to update and manage user information related to a member user/player. User profiles may be stored in database 140.

The plurality of players 115 accesses the game cloud system 110 via network 150 via corresponding client devices 240A-240N, wherein each client device may be configured with a game executing engine 111A-111N configured to execute game logic, or may be configured as a thin client that interfaces with a back end server providing computational functionality (e.g., including game executing engine 175 configured to execute game logic 177), such as in a streaming configuration. In that manner, game play is primarily executed in the GCS 110, such that a corresponding client device 240 will receive a stream of game video frames from GCS 110, and user input commands for driving the game play can be transmitted back to the GCS 110. In particular, a client device 240A of a corresponding player 5A is configured for requesting access to gaming applications over a network 150, such as the internet, and for rendering instances of a video game executed by the game server 105 and delivered to a display device associated with the corresponding player 5A. For example, player 5A may be interacting through client device 240A with an instance of a video game executing on game processor of game server 105. More particularly, an instance of the gaming application is executed by the game execution engine 175. Game logic (e.g., executable code) implementing the video game is stored and accessible through data store or database 140, and is used to execute the video game. Game execution engine 175 is able to support a plurality of video games using a plurality of game logics 177.

As shown, the game cloud system 110 includes a game server 105 that provides access to a plurality of interactive video games or gaming applications. Game server 105 may be any type of server computing device available in the cloud, and may be configured as one or more virtual machines executing on one or more hosts. For example, game server 105 may manage a virtual machine supporting a game processor that instantiates an instance of a gaming application for a user. As such, a plurality of game processors of game server 105 associated with a plurality of virtual machines is configured to execute multiple instances of one or more video games associated with game plays of the plurality of users 115. For example, the game cloud system 110 may include a plurality of virtual machines (VMs) running on a hypervisor of a host machine, with one or more virtual machines configured to execute a game processor module utilizing the hardware resources available to the hypervisor of the host. In that manner, back-end server support provides streaming of media (e.g., video, audio, etc.) of game plays of a plurality of video games to a plurality of corresponding users.

In particular, in the distributed game server system a distributed game execution engine executing game logic is configured as a corresponding instance of a corresponding video game. In general, the distributed game execution engine takes each of the functions of a game execution engine and distributes those functions for execution by a multitude of processing entities functioning as a central processing unit (CPU) and graphics processing unit (GPU) group. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the game cloud system, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the video game in response to controller input by a player. The distribution synchronization layer is able to efficiently execute (e.g., through load balancing) those functions across the distributed processing entities, such that critical game engine components/functions are distributed and reassembled for more efficient processing.

System 100 provides gaming control to the plurality of players 115 (e.g., players 5A-5N), such that each of client devices 240A-240N may receive input from various types of input devices, such as game controllers, tablet computers, keyboards, gestures captured by video cameras, mice touch pads, etc. Client device 240 can be any type of computing device having at least a memory and a processor module that is capable of connecting to the game server 105 over network 150. Also, client device 240 of a corresponding player is configured for generating rendered images executed by the game execution engine 111 executing locally or executed by game execution engine 175 executing remotely, and for displaying the rendered images on a display. For example, the rendered images may be associated with an instance of a corresponding video game executing locally on the client device 240 of a corresponding player, or the client device 240 is configured to interact with an instance of a corresponding video game executing remotely via game server 105 to implement a game play of a corresponding player, such as through input commands that are used to drive game play.

In one embodiment, client device 240 is operating in a single-player mode for a corresponding player that is playing a video game. In another embodiment, multiple client devices 240 are operating in a multi-player mode for corresponding players that are each playing a specific video game. In that case, back-end server support via the game server 105 may provide multi-player functionality, such as through the multi-player processing engine 119 that is configured for controlling a multi-player gaming session for a particular gaming application. For example, multi-player processing engine 119 communicates with the multi-player session controller 116, which is configured to establish and maintain communication sessions with each of the users and/or players participating in the multi-player gaming session. In that manner, players in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable direct memory access (DMA) state, buffered data for the DMA, audio chip state, CD-ROM (compact disk read only memory) state, etc. Game state data may also identify which parts of the executable code need to be loaded to execute the video game from that point. Game state data may be stored in database or datastore 140, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user when playing the game, game level, character attributes, character location, number of lives left, the total possible number of lives available, armor, trophy, time counter values, etc. User saved data may also include user profile data that identifies a corresponding player, for example. User saved data may be stored in database 140.

In addition, state data may include metadata that is configured to provide information and/or context to other information, such as the game state data and the user saved data. Metadata may provide relational connections between different information, or provide any type of useful information. For example, metadata may include information describing the gaming context of a particular point in the game play of a player, such as where in the game the player is, type of game, mood of the game, rating of game (e.g., maturity level), the number of other players there are in the gaming environment, game dimension displayed, the time of the collection of information, the types of information collected, region or location of the internet connection, which players are playing a particular gaming session, descriptive information, game title, game title version, franchise, format of game title distribution, network connectivity, downloadable content accessed, links, language, system requirements, hardware, credits, achievements, awards, trophies, etc.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

Back-end server support via the game server 105 may provide additional features, such as implementing a microservices back-end 250 configured to implement application based services, such as those supporting game plays of video games as interfaced and/or implemented through user interfaces 210 (e.g., 210A-210N of client devices 240A-240N). Game server 105 and/or the microservices in the microservices back-end may utilize and/or access information stored in one or more data lakes 280, or services provided by the data lakes 280. The game server 105 may also work cooperatively with a remote system providing monitoring tools 270, such as tools provided by a third party, wherein the monitoring tools 270 are configured to maintain logs of system activity, such as code paths taken in components of a microservices architecture and information related to the code paths.

Further, game server 105 may work cooperatively with the AI processor 160 in order to identify and or classify trends occurring in a microservices architecture using artificial intelligence. As such, GCS 110 is configured to identify trends associated with the microservices architecture that may be configured for providing application based services supporting game plays in association with GCS 110, and to provide additional responses and/or reactions in response to those classified and/or identified trends. For example, AI processor 160 is configured to implement a machine learning engine 190 (e.g., through a machine learning model) in order to identify and/or classify trends associated with the microservices architecture that may be configured for providing application based services supporting game plays in association with GCS 110, in accordance with one embodiment of the present disclosure. After identifying and/or classifying trends, such as an increase or decrease in resource demand in the microservices architecture, the action engine 650 may be configured to scale system resources based on those demand trends.

Figure 2:
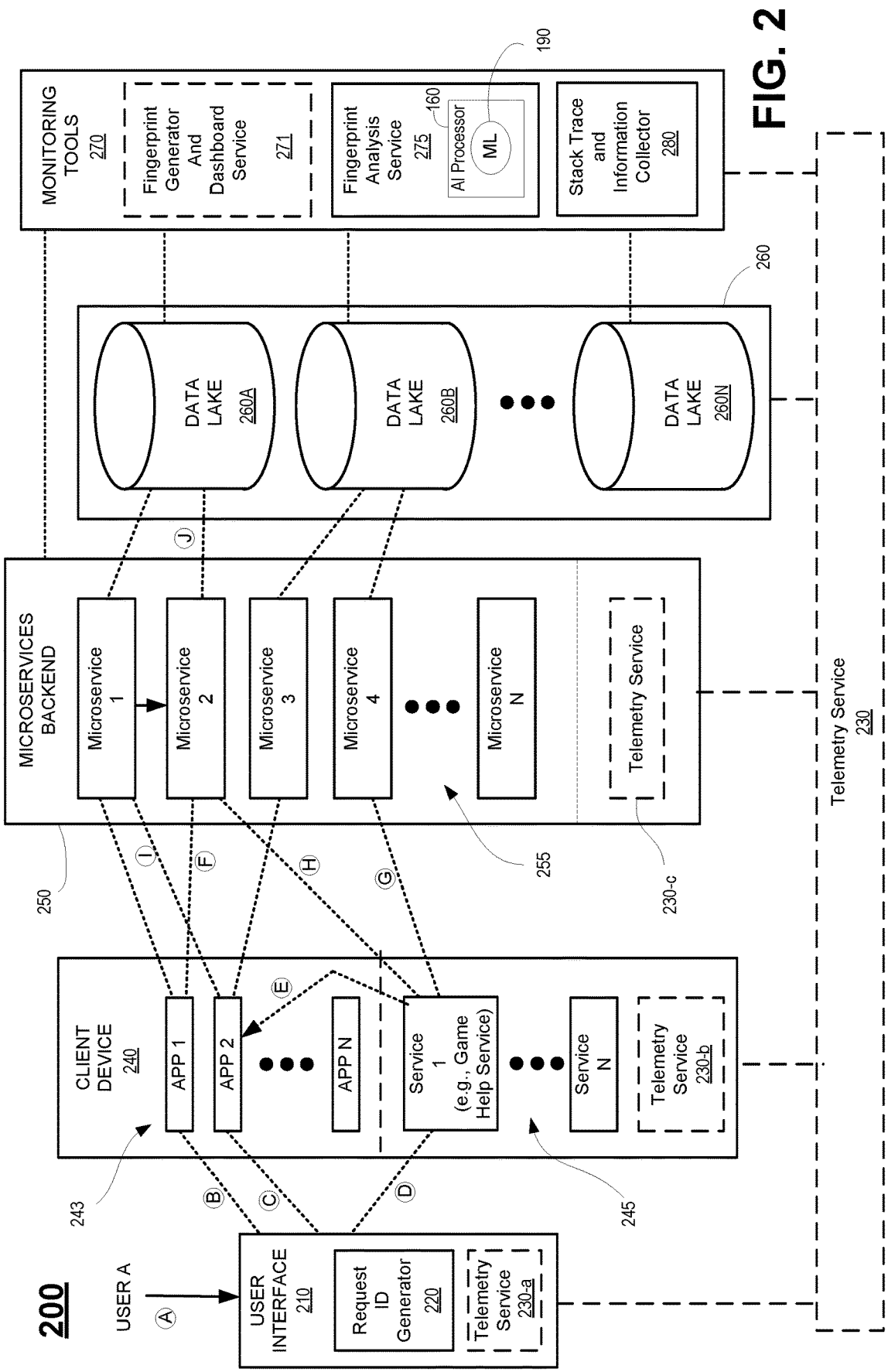
FIG. 2 illustrates a system configured for generating stacktrace signatures used for bug triaging in a microservices architecture, in accordance with one embodiment of the present disclosure.

FIG. 2 illustrates a system 200 configured for generating stacktrace signatures used for bug triaging in a microservices architecture, in accordance with one embodiment of the present disclosure. For illustration purposes, system 200 provides support for various functionalities, including providing for video game play to a user (e.g., user A) and video game services to the user utilizing a microservices architecture. However, system 200 is equally configured for providing application based services that are not supporting video games, such as any application that utilizes a microservices architecture.

In particular, User A is shown providing input to a user interface 210 in system 200, wherein the user interface 210 may be implemented by client device 240, or any other device. For example, the input may be controller input used for controlling a video game. In another example, the input provided to the user interface 210 may be a request for application based services that are provided in support of the game play of user A. For instance, while playing the video game, the user may request assistance for playing a particular part of the game, wherein the assistance may be in the form of tips provided in text or video, audio connection to live expert help, audio and video connection to live expert help, recorded video help session, etc. The request is handled by an application based service (e.g., Game Help Service) supported by a microservices architecture. For example, the application based service (e.g., Game Help Service) may be represented by Service 1 on client device 240, which may be a game console. The application based service (e.g., Game Help Service) may provide a result for the request back to the user interface 210. For example, Service 1 may be configured as a video streaming service that returns a command to load video from another third party service (e.g., YouTube®) to begin at this timestamp of the video for streaming to the user interface 210. The loaded video may provide assistance from an expert.

In one embodiment, the user interface may include a request ID generator 220. In particular, generator 220 is configured to generate a unique request identifier (i.e., request ID) associated with the request being made by user A through user interface 210. Though the request ID generator 220 is shown located at user interface 210, the generator 220 could be located at any other location, such as client device 240. In one embodiment, the request ID may be a hash of the stacktrace or code-path taken in the user interface 210 when handling the request.

As the request is being handled by one or more components (e.g., service, application, microservice, subsystem a microservices architecture), the request ID is propagated to each of those components in association with the request. Responses by any of the components also include the request ID in order to relate different responses from the components to the initial request identified by the request ID. For example, the user interface 210 may send the request along with the request ID to one or more applications or one or more services on the client device 240.

System 200 includes a telemetry service 230 that is configured to collect information associated with responses from components handling the request, or its portion of the request, that is identified by the request ID. The information collected may include timing information, such as the time needed to handle its portion of the request at a corresponding component (e.g., microservice). The information may include one or more stacktrace signatures or code-path identifiers that identify system interaction of a corresponding component when handling the request associated with the request ID. In particular, the stacktrace signatures or code-path identifiers may be associated with the code-path taken by a corresponding component handling the request that is identified by the request ID. As such, the terms stacktrace signature and code-path identifier are interchangeable. In one embodiment, the code-path identifier is a hash of the corresponding code-path or stacktrace that is taken by a corresponding microservice or component of the microservices architecture. The information may be used for generating a fingerprint that is associated request, and more particularly associated with the system interaction of all the components used within the microservices architecture for handling a request associated with the request ID.

In embodiments, the telemetry service 230 may be located at any location within the system 200 that is configured for receiving and/or collecting (e.g., directly, through forwarding, by request, etc.) the information from each of the components used for handling the request associated with the service ID. That is, the telemetry service 230 is centralized to the components. For example, the telemetry service 230 may be located at user interface 210, or client device 2420, or microservices back-end 250, or any other location within system 200. In some embodiments, telemetry service 230 may be configured to collect other data (e.g., game state data, metadata, and user save data) during game play of user A.

System 200 includes client device 240, which is configured to communicate with the user interface 210. In one implementation, client device 240 generates the user interface 210. For example, client device 240 may be a gaming console. In other example, client device is a computing resource configured to execute one or more applications and/or service based applications. In one embodiment, the client device 240 is a local device that is local to user A. In another embodiment, client device 240 is remote from the user, such as being located at a back-end game cloud system. In that manner, the user may access the remote client device through a thin client, as previously described.

In particular, client device may include one or more applications (e.g., app 1, app 2, . . . , app N), wherein the applications may rely on processes and/or routines performed by microservices in a microservices architecture. For example, app 1 may be configured to determine the game context of the game play of user A that is playing the video game. App 1 may be calling other microservices in a microservices architecture (e.g., back-end 250) to help determine the game context. App 2 may be configured to guide user A to the help being provided in response to the request associated with the request ID. For example, app 2 may be configured to load recorded video of expert help onto the display accessible by user A (e.g., within user interface 210). The information generated and/or provided to the applications (e.g., app 1 and app 2) may be provided to service 1 (e.g., Game Help Service) that is configured to generate the response to the request associated with the request ID, wherein the response is provided to the user interface 210.

Client device may also include one or more services (e.g., service 1, . . . , service N). As previously described, for purposes of illustration, service 1 may be a Game Help Service. For example, service 1 may generate a response to the request associated with the request ID that is based on data and responses from components in the microservices architecture. As previously described, service 1 may be configured as a video streaming service, which instructs (e.g., instructs app 2 to load the video) or itself performs the loading of video at a particular point, wherein the response includes a video of expert help.

System 200 may include a microservices back-end 250, which is configured with one or more layers of microservices within a within a microservices architecture. Each microservice may be represented as a node in a network of microservices of the microservices architecture For example, microservices back-end 250 includes microservice 1, . . . , microservice N. The microservices back-end 250 may be provided through or in cooperation with a cloud gaming system 110, or gaming service, in embodiments. In other embodiments, microservices may be provided through a third party. As previously described, microservices in the back-end 250 or microservices architecture act independently from other microservices and are configured to provide a single process or function that is lightweight. Microservices communicate with each other using APIs, for example to pass along data to the next leg of handling a request associated with the request ID, or make requests for information that are returned, to return a response to a component within the microservices architecture handling its portion of the request associated with the request ID, etc. In that manner, the microservices in the back-end 250 or architecture are able to cooperatively process the request associated with the request ID. In other words, the microservices in the back-end 250 are configured to provide in combination the functionality of the large-scale, service-oriented application.

In particular, the request ID is propagated through each stage in the microservices back-end 250 of handling the request associated with the request ID. That is, as data and information is passed between components of the microservices architecture (e.g., services, applications, microservices, microservices in the back-end 250, subsystems in the microservices architecture, etc.), the request ID is also passed. In that manner, processes and/or routines performed during handling of the request associated with the request ID can be related through the propagation of the request ID, in embodiments.

System 200 also include one or more data lakes 26, including data lake 260A, data lake 260B, . . . , data lake 260N. Each of the data lakes provide resources that help one or more components in a microservices architecture. For example, a data lake may store data, third party content (e.g., videos on YouTube®), and databases. In another example, the data lake may include analyzed information about other entities (e.g., data from microservices, or services, or third party services, etc.). For example, the data lake may include analysis information or identifying information about the videos in the third party video service (e.g., YouTube). In another example, a data lake may include information related to game contexts of a particular video game, for instance in order to identify game contexts of a corresponding player.

System 200 includes monitoring tools 270 configured for providing analysis on the information collected at each of the components of a microservices architecture, such as when handling request associated with the request ID, and other request associated with request IDs. For example, monitoring tools 270 includes fingerprint generator and dashboard service 271, fingerprint analysis service 275, and stacktrace and information collector 280.

In particular, fingerprint generator and dashboard service 271 is configured to generate a fingerprint related to stacktraces of components of a microservices architecture utilized when handling a request associated with a request ID. The dashboard functionality provided by the dashboard service generates an interface (e.g., user interface) for displaying information generated through analysis of one or more fingerprints, and in the information related to the one or more fingerprints.

Also, fingerprint analysis service 275 is configured to analyze the one or more fingerprints. As shown, it is possible to use artificial intelligence (e.g., a machine learning model) for analyzing fingerprints and information related to the fingerprints. For example, AI processor 160 is configured to implement a machine learning engine 190 (e.g., through a machine learning model) in order to identify and/or classify trends associated with the microservices architecture that may be configured for providing application based services supporting game plays of one or more video games provided through client side devices, or through a game cloud service. Additional responses may be taken in response to the classified and/or identified trends, such as scaling system resources based on trends identifying resource demand.

Further, stacktrace and information collector 280 is configured to capture logs of stacktraces throughout a microservices architecture. In some implementations, the collector 280 is managed by the microservices architecture, whereas in other implementations, the collector 280 may be a third party collection service. For example, collector 280 is able to independently communicate with each of the microservices in the microservices back-end and/or other components of a corresponding microservices architecture configured to handle requests from an application based service. That is, the stacktrace and information collector 280 automatically collects information related to the stacktraces or code-paths implemented within a corresponding microservice or corresponding component of a microservices architecture. In some embodiments, the collector 280 collects code-path identifiers that are used in generated fingerprints, such as the fingerprint generated from stacktraces of microservices or components of a microservice architecture that are used to handle a request associated with the request ID. Further, the collector 280 is configured to aggregate the logs of the stacktraces and/or code paths, index them, and allow access to the stacktraces and/or code-paths in the logs. In some embodiments, the logs may be indexed based on corresponding code-path identifiers and/or fingerprint. In that manner, events (e.g., errors) occurring during the handling of the request associated with the request ID may be discoverable using the fingerprint, stacktrace signature, and/or code-path identifier. In particular, multiple events occurring at different microservices of the microservice architecture may be relatable or tied together through a corresponding fingerprint, thereby providing a more holistic remedy when addressing events having negative consequences (e.g., errors).

As shown in FIG. 2, data paths connect the user interface 210 with applications 243 and/or services 245 in the client device 240, connect applications 243 and microservices 245 with microservices 255 in the microservices back-end 250, connect microservices 245 to data lakes 260, connect data lakes to monitoring tools 270, and/or connect the microservices in the back-end 250 to the monitoring tools 270. The data paths shown may be taken when handling the request of the user A provided to the user interface 210, wherein the request is associated with the request ID. For example, data path A may indicate the receipt of the request at the user interface 210. Data path B may indicate routines performed by app 1 and data path C may indicate routines performed by app 2. Data path D may indicate the return of a result from the service 1 to user interface 210. Data path E may indicate data transferred to service 1 from app 2, or the request of data from app 2. Data path F may indicate a request for services from app 2 or the services performed at microservice 2 and the results thereof. Data path G may indicate a request for services from service 1 or the services performed at microservice 4 and the results thereof. Data path H may indicate a request for services from service 1 or the services performed at microservice 2 and the results thereof. Data path I may indicate a request for services from app 2 or the services performed at microservice 1 and the results thereof. Data path J may indicate a request for information and/or services from microservice 1, or the service performed at data lake 260A and the results thereof (e.g., information). Other data paths are shown that may contribute to handling of the request by user A that is associated with request ID. For example, data paths may connect microservices at back-end 250 and/or the data lakes 260 to the monitoring tools 270 for purposes of logging stacktraces and code-paths performed at the microservices and/or data lakes. Additional data paths (not shown) may be available for logging stacktraces and code paths of the applications and services at client device 240, and/or routines performed at the user interface 210.

Figure 3:
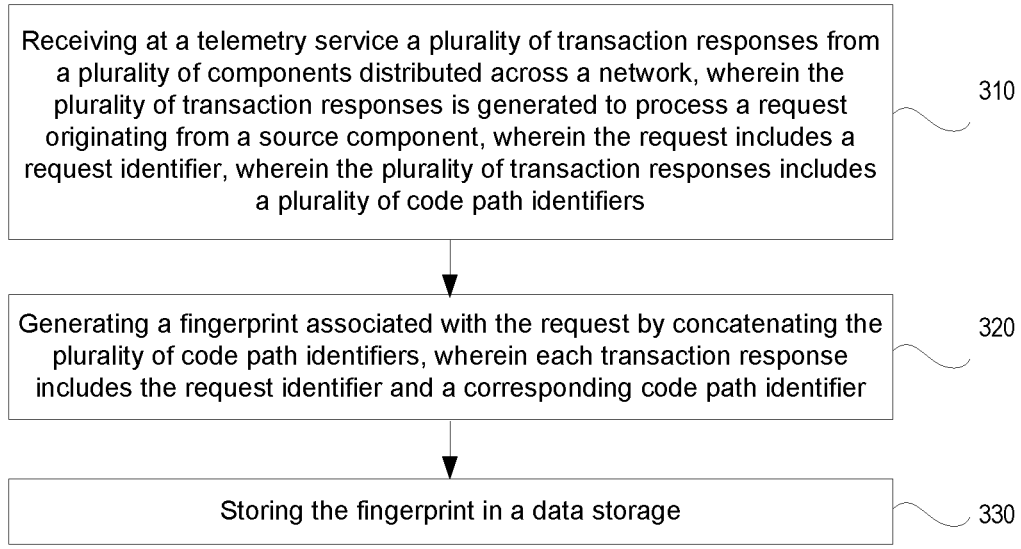
FIG. 3 is a flow diagram illustrating a method for generating a unique fingerprint for system interaction within a microservices architecture, in accordance with one embodiment of the present disclosure.

With the detailed description of the client system, game cloud system, microservices architecture, system 200, monitoring tools 270, system 400, AI processor, machine learning engine, AI model, etc. of FIGS. 1 and 2, flow diagram 300 of FIG. 3 discloses a method for generating a unique fingerprint for system interaction within a microservices architecture, in accordance with one embodiment of the present disclosure. The operations performed in flow diagram 300 may be implemented by one or more of the entities previously described components, and also systems 100 and 200 as described in FIGS. 1-2 that are configured to classify player behavior, in some embodiments.

Although the method of flow diagram 300 is described within the context of playing video games, and supporting the execution of the video games or providing additional support of the game play of the video game, embodiments of the present disclosure are well suited to generating unique fingerprints corresponding to system interactions within a microservices architecture that is implemented by a microservices architecture.

At 310, the method includes receiving at a telemetry service a plurality of transaction responses from a plurality of components distributed across a network. The plurality of transaction responses is generated by the components in the microservices architecture involved in processing and/or handling a request originating from a source component (e.g., user interface, etc.). For example, the request is for services provided by a software based application that is implemented through a microservice architecture. For illustration purposes only, the request may be a call for assistance by a user playing a video game, wherein the request is directed to a game help service (e.g., the software based application) that is supporting the game play of the video game. As such, the request that is directed to the game help service is handled and/or processed by the microservices architecture. For example, the game help service and microservices architecture may be part of a gaming system or game cloud system that supports the game plays of a plurality of users.

The request includes a request identifier (request ID). For example, the request identifier could be generated by the request ID generator 220, when the user interface receives the request. The request ID is propagated to every component within the microservices architecture that is involved in handling the request. As previously described, components within the microservices architecture may be a service, an application, a microservice, a subsystem of the microservices architecture, or any component that is involved in handling the response.

Different components in the microservices architecture may be involved in handling the request associated with the request ID, wherein each component generates a transaction response, for example that may be used by other components. That is, the microservices architecture distributes the various portions of handling of the request to different components in the microservices architecture. Ultimately, the final response to the request associated with the request ID may be passed back to the source (e.g., user interface) that originated the request, or to another component for displaying and/or storing the final response. As data (e.g., contained within the corresponding transaction response) is passed between components of the microservices architecture involved in handling the request, the request ID is also passed. In that manner, each of the processes involved in handling the request may be associated with each other.

In addition, the plurality of transaction responses includes a plurality of code-path identifiers. In one embodiment, the code-path identifiers are deterministic, as previously described, such that the plurality of transaction responses includes a plurality of deterministic code-path identifiers.

Deterministic generation could use any number of mechanisms, ranging in complexity from a string-based identifier using an MD5 hash, or a map with metadata as space/data constraints allow. For instance, each transaction response that is generated by a component of the microservices architecture is associated with a corresponding code-path identifier. More particularly, a code-path identifier is associated with the code-path that the data flowed through in the corresponding component. For example, the code-path identifier may be a hash of the corresponding stacktrace or code-path taken by the corresponding component that is involved in handling the request associated with the request ID, as will be further described below in relation to FIG. 4.

Further, each of the plurality of transaction responses may include processing information for corresponding components of the microservices architecture. For example, the processing information may be an elapsed time generating the transaction response by the corresponding component. The processing information may include an application version used by the component for processing the corresponding transaction response. For example, this processing information may be used for determining trends occurring within the microservices architecture.

In one embodiment, the data flowing through the microservices architecture when handling the request associated with the request ID may involve dependent components. For example, the data may flow from microservice 1, then to microservice 2, and then to microservice 3 before being returned to the telemetry service. That is, there may be multiple component dependencies involved in the data path before reaching the telemetry service. As data is being passed between components, the sending component delivers its corresponding transaction response, the transaction ID, its corresponding processing information, and its corresponding signature trace and/or code-path identifier, and any relevant information from dependency components (e.g., code-path identifiers, processing information, etc.). Using the above example, if the dependency component is microservice 2, then as data is passed from microservice 3 to the telemetry service, pertinent information from microservice 2 is also passed by microservice 3. For example, microservice 3 will pass relevant information from the transaction response of microservice 2, including the corresponding signature trace and/or code-path identifier, and corresponding processing information from microservice 2 (e.g., elapsed processing time, application versioning, etc.). In particular, the transaction response of microservice 3 will include at least the code-path identifier from microservice 2, and the processing information from microservice 2. Additionally, the relevant information from microservice 1 may also be passed by microservice 1, if necessary.

At 320, the method includes generating a fingerprint associated with the request associated with the request ID by concatenating the plurality of code path identifiers. As previously described, each of the transaction responses includes the request identifier (request ID) and a corresponding code path identifier, along with corresponding processing information. In one embodiment, the code-path identifiers are concatenated in order of receipt of each code-path identifier by the telemetry service.

At 330, the method includes storing the fingerprint in a data storage. In that manner, the fingerprint may be associated with other fingerprints, and the processing information associated with that group of fingerprints may be analyzed to determine trends occurring within the microservices architecture. For example, the fingerprints, stacktrace signatures and/or code-path identifiers associated with components in a microservices architecture involved in handling requests of a software based application may be used for bug triaging.

In one embodiment, each of the fingerprints in the group of fingerprints may be similar, or substantially similar. That is, the data paths through the microservices architecture may be similar or substantially similar. For example, the requests associated with the fingerprints in the group of fingerprints may be similar, such that the requests from users playing a video game is related to task that is to be performed. In one illustration, the request may be related to a task of beating the boss, wherein the request may be associated with a call for assistance from a user playing a video game (e.g., "I need tips on how to beat the Boss on Level 4 of video game 5."

Figure 4:
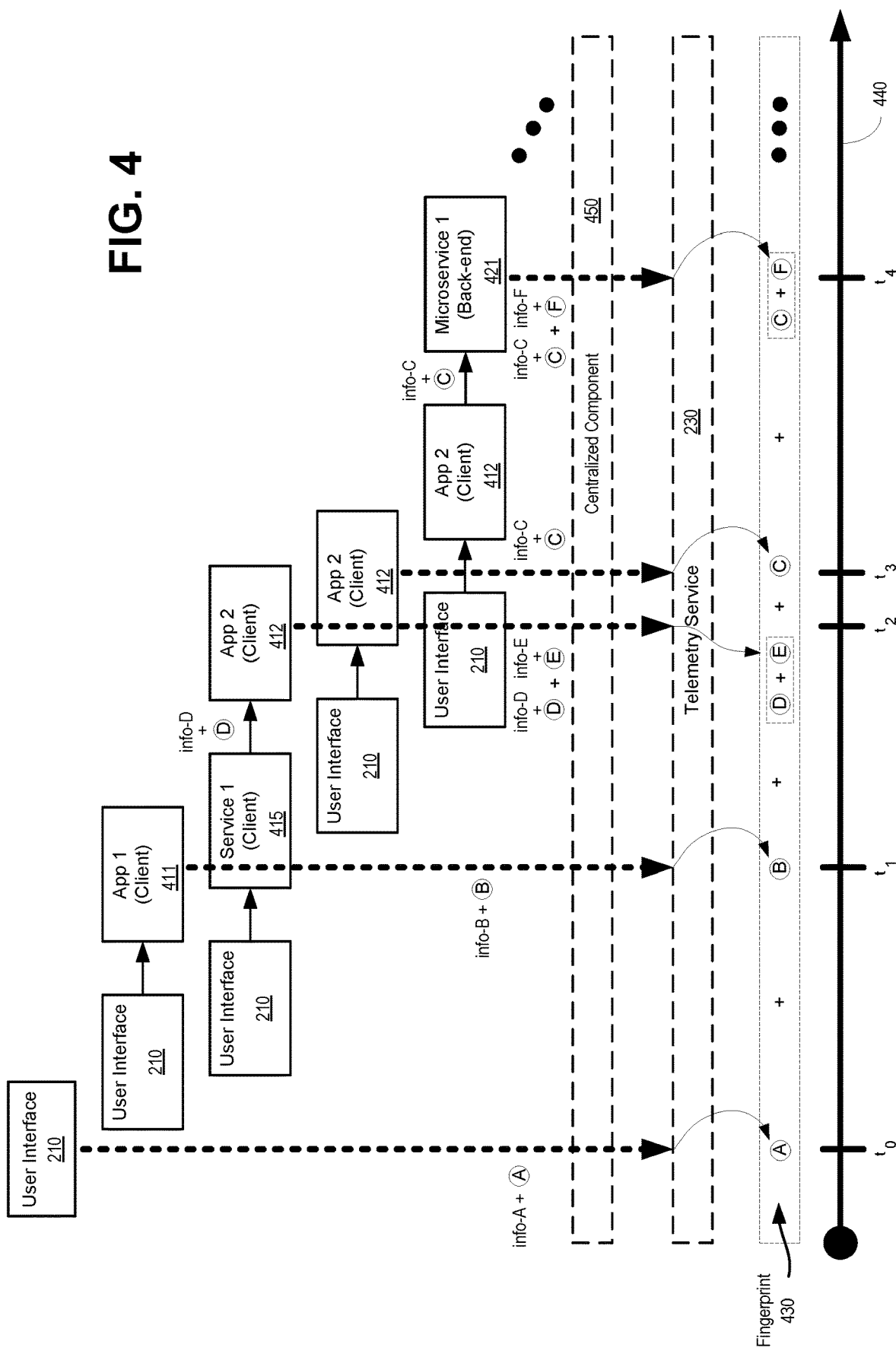
FIG. 4 is an illustration of a fingerprint of system interaction generated when providing a service request implemented through a microservices architecture, wherein the fingerprint includes stacktrace signatures related to code paths taken through the microservices architecture, in accordance with one embodiment of the present disclosure.

FIG. 4 is an illustration of a fingerprint 430 of system interaction generated when providing a response to a service request as implemented through a microservices architecture, wherein the fingerprint includes stacktrace signatures related to code-paths taken through the microservices architecture, in accordance with one embodiment of the present disclosure. Throughout the specification, the stacktrace signature may also be referred to as a code-path identifier. For example, the fingerprint 430 may be generated by fingerprint generator and dashboard service 270 in association with the service 200 handling a request for application based services, wherein the request is associated with the request ID, as previously described.

Purely for illustration, the fingerprint 430 may include code-path identifiers related to stacktraces or code-paths performed at components of the microservices architecture that are involved in handling the request associated with the request ID. The data used for generating the fingerprint 430 may be collected by telemetry service 230, and generated by fingerprint generator and dashboard service 270. The data collected by the telemetry service 230 may first pass through a centralized component 450 used for handling the request associated with the request ID, such as the user interface 210, or the client device 240, or at the microservices back-end 250. More particularly, the telemetry service 230 may be located at the centralized component 450, or have information forwarded from the centralized component 450 to the telemetry service 230. In one embodiment, the fingerprint 430 is a concatenation of the code-path identifiers that are related to the code paths taken by components utilized by the microservices architecture when handling the request associated with the request ID. In another embodiment, the fingerprint 430 includes code-path identifiers that are concatenated in the order of receipt of each stacktrace signatures and/or code-path identifiers by the telemetry service 230, as is shown in FIG. 4.

In one embodiment, the stacktrace signature and/or code-path identifier is a hash of the corresponding stacktrace or code-path taken by a corresponding component of the microservices architecture that is involved in handling the request associated with the request ID. In particular, the code-path may include a set of instructions that are executed within the corresponding component. Similarly, a stacktrace may represent a call stack at a particular point in time, wherein the call stack includes information about the active subroutines performed by the component. For example, the stacktrace and/or call stack may include the function calls (e.g., instructions) performed and/or executed by the corresponding component. For purposes of simplicity, the terms stacktrace and code-path may each refer to the set of instructions that are executed within the corresponding component, which are associated with the function calls executed by the corresponding component, though they may be technically different. Correspondingly, the terms stacktrace signature and code-path identifier may refer to similar items, and are interchangeably used throughout the specification. For example, a stacktrace signature and/or a corresponding code-path identifier may be a hash of the code-path taken (e.g., instructions executed) by the corresponding component within the microservices architecture that is handling the request associated with the request ID. In one implementation, instructions of a corresponding stacktrace are executed in a corresponding component, wherein the stacktrace is hashed to generate the corresponding code-path identifier. As previously described, components may be services, applications, microservices, subsystems of a microservice architecture, etc. that are handling requests made to an application based service (e.g., game help service supporting a game play of a video game).

In one embodiment, the telemetry service 230 receives a stacktrace signature and or a code-path identifier corresponding to a component of the microservices architecture involved in handling the request associated with the request ID, and information related to that signature and/or identifier. In particular, the information may include processing information, such as an elapsed time for processing at a corresponding component, and application versioning information for that component, etc., as previously described. The telemetry service may located at any one of a number of locations configured to receive information from the components of a microservices architecture, such as a user interface accessible by a user, or a client device local to the user, or a client device located at a back-end server (e.g., game cloud system), or a back-end server.

In particular, fingerprint 430 includes the code-path identifiers that are concatenated in order of receipt by the telemetry service 230, as follows: A-B-D-E-C-C-F . . . . The lettering representing the code-path identifiers may be associated with the path lettering in FIG. 2, for illustration purposes. For example, telemetry service 230 first receives code-path identifier "A" along with corresponding processing information (e.g., info-A) from user interface 210, as indicated in timeline 440 at time t-0.

Next, telemetry service 230 receives code-path identifier "B" along with corresponding processing information (e.g., info-B) from app 1 (411) at the client device, as indicated in timeline 440 at time t-1. The functions performed by app 1 may have been called by the user interface 210, wherein relevant information from the operations performed at user interface 210 may also be passed to the telemetry service 230 by app 1 at the client device.

Next as indicated by timeline 440 at time t-2, telemetry service 230 receives code-path identifiers "D" and "E" along with corresponding processing information (e.g., info-D) from service 1 (415) at the client device and information (e.g., info-E) from app 2 (412 at the client device. Service 1 may perform dependent operations, as data is further passed from app 1 (415) to app 2 (412) at the client device before any data is received at the telemetry service 230, including the code-path identifier and processing information from service 1 (415) at the client device, for example. The functions performed by service 1 (415) and app 2 (412) may have been originally called by the user interface 210, wherein relevant information from the operations performed at user interface 210 may also be passed along to the telemetry service 230 by service 1 (415) and app 2 (412).

Next as indicated by timeline 440 at time t-3, telemetry service 230 receives code-path identifier "C" along with corresponding information (e.g., info-C) from app 2 (412) at the client device. The operations performed in association with code-path identifier "C" by app 2 (412), may be different than the operations performed in code-path identifier "E" by app 2 (412). The functions performed by app 2 (412) may have been called by the user interface 210, wherein relevant information from the operations performed at user interface 210 may also be passed to the telemetry service 230 by app 2 at the client device.

Next as indicated by timeline 440 at time t-4, telemetry service 230 receives code-path identifiers "C" and "F" along with corresponding processing information (e.g., info-C) from app 2 (412) at the client device and processing information (e.g., info-F) from microservice 1 (421) at a microservices back-end. App 2 may perform dependent operations, as data is further passed from app 2 (412) to microservice 1 (421) at the microservices back-end before any data is received at the telemetry service 230, including the code-path identifier and processing information from app 2 (412) at the client device, for example. The operations performed in association with code-path identifier "C" by app 2 (412) received by the telemetry service at time t-4, may be similar to the operations performed in code-path identifier "C" also by app 2 (412) received by the telemetry service at time t-3. The functions performed by app 2 (412) and microservice 1 (421) may have been originally called by the user interface 210, wherein relevant information from the operations performed at user interface 210 may also be passed along to the telemetry service 230 by app 2 (412) and microservice 1 (421).

As indicated in FIG. 4, other code-path identifiers and corresponding processing information may also be received by the telemetry service from components involved in handling a request that is processed by a software based application. That is, the fingerprint shown in FIG. 4 may not be complete.

Figure 5:
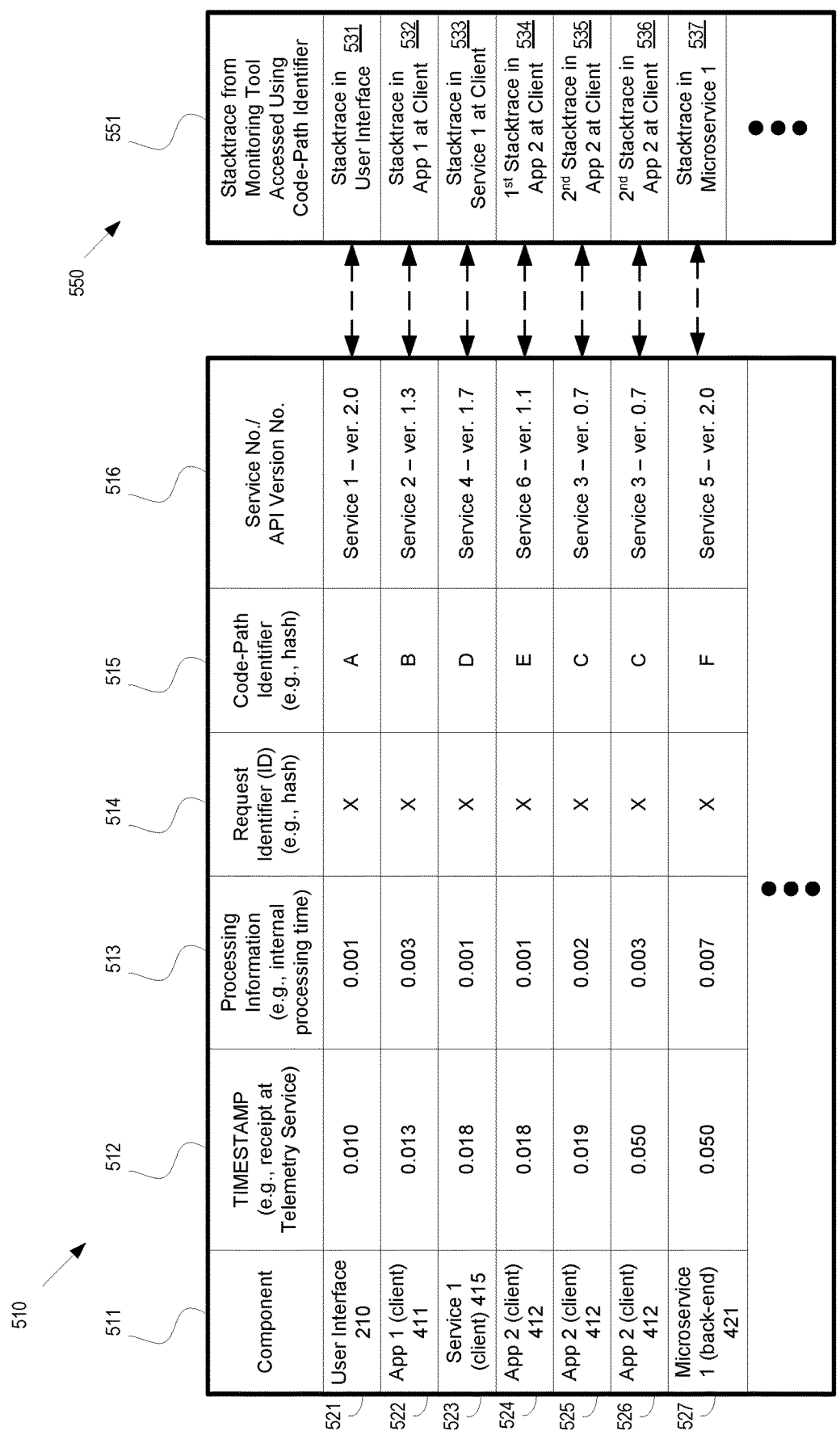
FIG. 5 illustrates a table including relevant information associated with a fingerprint of system interaction generated when providing a service request implemented through a microservices architecture, wherein the fingerprint includes stacktrace signatures related to code paths taken through the microservices architecture, in accordance with one embodiment of the present disclosure.

FIG. 5 illustrates a tables 510 and 550 including relevant information associated with a fingerprint of system interaction generated when providing a service request implemented through a microservices architecture, wherein the fingerprint includes stacktrace signatures and/or code-path identifiers related to code-paths taken by components involved in handling the service request (e.g., that is associated with a request ID) through the microservices architecture, in accordance with one embodiment of the present disclosure. For purposes of illustration, the information in table 510 and table 550 may be related to fingerprint 430 (e.g., A-B-D-E-C-C-F . . . ) that is shown in FIG. 4.

In particular table 510 shows relevant information related to transaction responses of components of a microservices architecture involved in handling a request from a software based application. The relevant information may be received at the telemetry service (e.g., telemetry service 230). For example, information in a row is received at one time by the telemetry service, and is related to a corresponding transaction response of a corresponding component in the microservices architecture.

For example, the relevant information in column 511 indicates which component is delivering data (e.g., the relevant information provided in a row of table 510) that is received by the telemetry service. The relevant information in column 512 is a timestamp generated by the telemetry service that corresponds to when the information is received from a corresponding component. The relevant information in column 513 includes processing information, and more particularly the elapsed time for generating a corresponding transaction response by a corresponding component that is involved in handling a request associated with the request ID. The relevant information in column 514 includes the request ID. The relevant information in column 515 includes the code-path identifier for the corresponding component, wherein the code-path identifier may be a hash of the corresponding stacktrace or code-path taken by a corresponding component of the microservices architecture that is involved in handling the request associated with the request ID. The relevant information in column 516 may include versioning information of the application used by the component for processing its corresponding transaction response, wherein the component is involved in handling the request associated with the request ID.

For illustration purposes, row 521 may include relevant information associated with the operations associated with code-path identifier "A" performed by the user interface 210 to include a timestamp of 0.010 seconds as generated by the telemetry service 230, processing time of 0.001 seconds at the user interface, and application versioning information (e.g., service 1, version 2.0).

Also, row 522 may include relevant information associated with the operations associated with code-path identifier "B" performed by app 1 (411) at the client device to include timestamp of 0.013 seconds as generated by the telemetry service 230, processing time of 0.003 seconds at app 1, and application versioning information (e.g., service 2, version 1.3).

Also, row 523 may include relevant information associated with the operations associated with code-path identifier "D" performed by service 1 (415) at the client device to include timestamp of 0.018 seconds as generated by the telemetry service 230, processing time of 0.001 seconds at service 1, and application versioning information (e.g., service 4, version 1.7).

Also, row 524 may include relevant information associated with the operations associated with code-path identifier "E" performed by app 2 (412) at the client device to include timestamp of 0.018 seconds as generated by the telemetry service 230, processing time of 0.001 seconds at app2, and application versioning information (e.g., service 6, version 1.1). The timestamps of 0.018 in rows 523 and 524 are identical, as the information in these rows are received in the same package at the telemetry service because service 1 (415) at the client device is providing a dependency service, such that the transaction provided by service 1 (415) is delivered to app 2 (412) at the client device before being transferred to the telemetry service 230 (e.g., via app 2).

Also, row 525 may include relevant information associated with the operations associated with code-path identifier "C" performed by app 2 (412) at the client device to include timestamp of 0.019 seconds as generated by the telemetry service 230, processing time of 0.002 seconds at app 2, and application versioning information (e.g., service 3, version 0.7).

Also, row 526 may include relevant information associated with the operations associated with code-path identifier "C" performed by app 2 (412) at the client device to include timestamp of 0.050 seconds as generated by the telemetry service 230, processing time of 0.003 seconds at app 2, and application versioning information (e.g., service 3, version 0.7). The application versioning information in rows 525 and 526 are identical, as the same application is being used by the same component—app 2 (412) at the client device.

Also, row 527 may include relevant information associated with the operations associated with code-path identifier "F" performed by microservice 1 (421) at the back-end to include timestamp of 0.050 seconds as generated by the telemetry service 230, processing time of 0.007 seconds at microservice 1, and application versioning information (e.g., service 5, version 2.0). The timestamps of 0.050 in rows 526 and 527 are identical, as the information in these rows are received in the same package at the telemetry service because app 2 (412) at the client device is providing a dependency service, such that the transaction provided by app 2 (412) is delivered to microservice 1 (421) at the back-end before being transferred to the telemetry service 230 (e.g., microservice 1).

In addition, column 551 in table 550 includes relevant information related to stacktraces and/or code-paths taken by a corresponding component when involved in handling a request associated with the request ID. In particular, column 551 may include log information related to the stacktrace and/or code-path of the corresponding component. The log information may be automatically collected by a monitoring tool that is configured to access the stacktrace and/or code-path. The monitoring tool may also be configured to capture the stacktrace signature and/or code-path identifier for the corresponding stacktrace and/or code-path utilized by the corresponding component. For example, block 531 includes relevant information related to code-path identifier "A", such as the corresponding stacktrace utilized by the corresponding component (e.g., user interface 210). Block 532 includes relevant information related to code-path identifier "B", such as the corresponding stacktrace utilized by the corresponding component (e.g., app 1 (411) at the client device). Block 533 includes relevant information related to code-path identifier "D", such as the corresponding stacktrace utilized by the corresponding component (e.g., service 1 (415) at the client device). Block 534 includes relevant information related to code-path identifier "E", such as the corresponding stacktrace (e.g., first stacktrace) utilized by the corresponding component (e.g., app 2 (412) at the client device). Block 535 includes relevant information related to code-path identifier "C", such as the corresponding stacktrace (e.g., second stacktrace) utilized by the corresponding component (e.g., app 2 (412) at the client device). Block 536 includes relevant information related to code-path identifier "C", such as the corresponding stacktrace (e.g., second stacktrace) utilized by the corresponding component (e.g., app 2 (412) at the client device). Block 537 includes relevant information related to code-path identifier "F", such as the corresponding stacktrace utilized by the corresponding component (e.g., microservices (421) at the back-end).

The code-path identifiers of a fingerprint may be used for determining a source of an error or negative event that is thrown when processing a request through a microservices architecture, wherein the request is associated with the fingerprint, in accordance with one embodiment of the present disclosure. In particular, FIG. 5 may provide an illustration of the use of a fingerprint in order to perform bug triaging (e.g., of one or more thrown errors, or any other status event or negative event, such as errors, undetermined status, warnings, etc.). As previously described, a fingerprint includes a concatenation of one or more code-path identifiers, or stacktrace signatures. As previously described, a code-path identifier may be a hash of the corresponding stacktrace or code-path taken by a corresponding component of the microservices architecture that is involved in handling a request associated with a request ID. As such, each of the code-path identifiers of components involved in handling the request associated with the request ID is included within the fingerprint. In one embodiment, the code-path identifiers are concatenated in order of receipt by a telemetry service. For example, a negative event (e.g., an error, undetermined status, warning, etc.) that is received in association with a request for services from a service based application may not include additional information, such as the corresponding stacktrace, or component associated with the negative event (e.g., throwing an error). For illustration, the following discussion is described within the context of errors, but could be applied to any negative event (e.g., error, undetermined status, warning, etc.) However, the error is associated with the processes used to handle the request, and by inference is associated with the fingerprint associated with the processes used to handle the request (e.g., the routines performed by each of the components involved in handling the request in the microservices architecture). Once the fingerprint is known, the stacktrace signatures and/or code-path identifiers contained within the fingerprint can be parsed out. Those stacktrace signatures and/or code-path identifiers can then be used to access the corresponding stacktraces and/or code-paths that are captured and stored by the monitoring tools 270. The source of the error may be found by parsing and/or searching the corresponding stacktraces and/or code-paths associated with the processes of components involved in handling the request. In addition, all the errors associated with a request may be discovered. In that manner, issues occurring in one or more microservices may be tied together, or related through the fingerprint. Many processes may be used to relate a corresponding code-path identifier to its stacktrace and/or code-path taken by a corresponding component. For instance, the stacktrace signature and/or code-path identifier may also be captured by the monitoring tool, in one embodiment. In another embodiment, hashes of stacktraces and code-paths captured by the monitoring tools 270 may be generated, and compared to the code-path identifier in the fingerprint.

Figure 6:
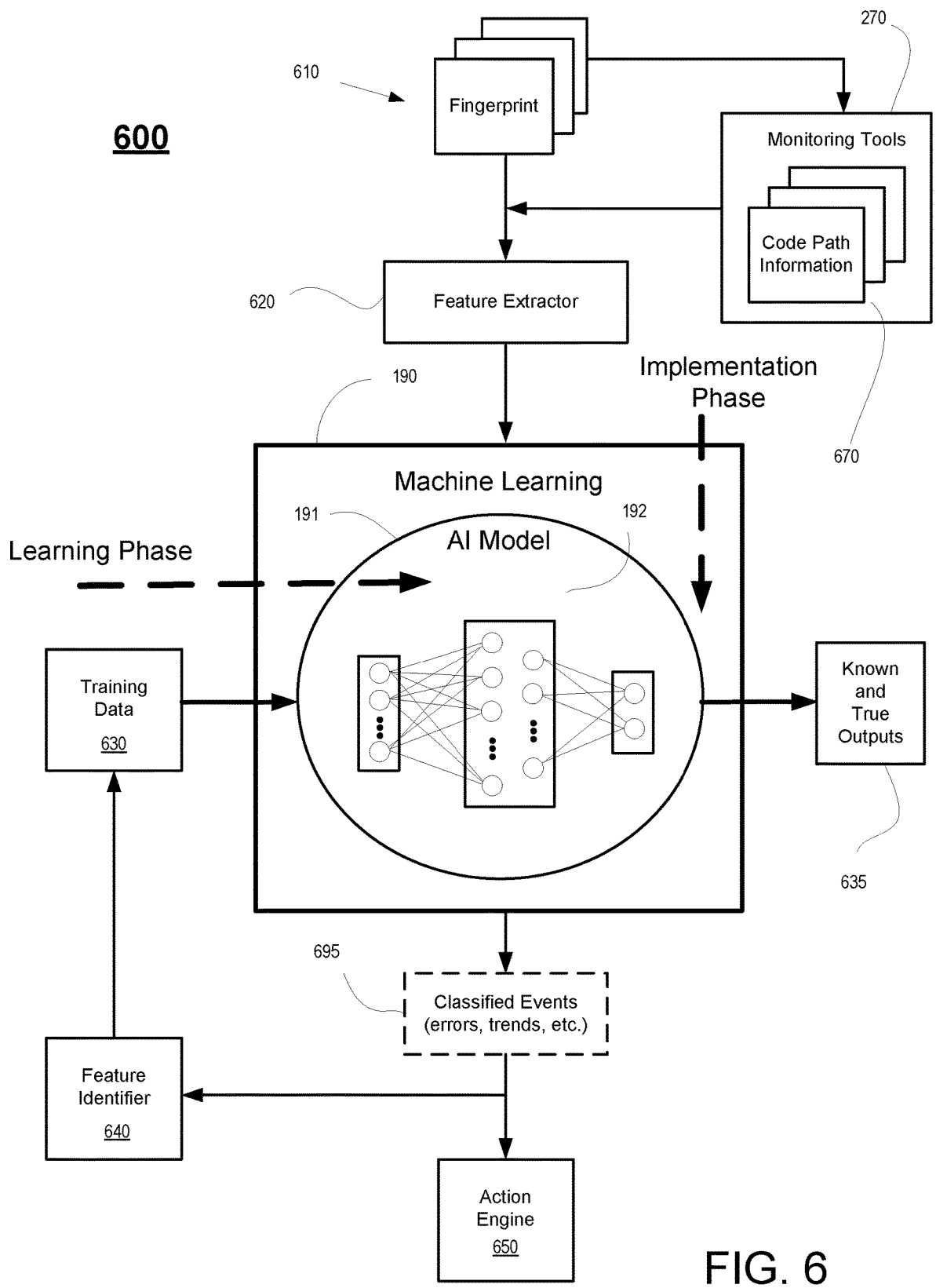
FIG. 6 is a data flow diagram illustrating management of a system implementing application based services supported through a microservices architecture, wherein the system management is implemented through the event classification determined by an artificial intelligence model and an action engine configured to act based on a corresponding classified event, in accordance with one embodiment of the present disclosure.

FIG. 6 is an illustration of a system 600 that is configured to train and implement an artificial intelligence model configured to identify and/or classify events and/or trends occurring in a microservices architecture, in accordance with one embodiment of the present disclosure. For example, the microservices architecture may be configured for handling requests made to a software based application. In particular, system 600 performs system management of application based services supported through a microservices architecture, wherein the system management is implemented through the event classification determined by an artificial intelligence model and an action engine configured to act based on a corresponding classified event, in accordance with one embodiment of the present disclosure.

In embodiments of the present disclosure, events, trends, and the like occurring within a microservices architecture can be classified using an AI model 191, also referred to as an AI learning model. In general, the AI model can be configured to learn and/or classify any aspect that is associated with handling a request in a microservices architecture. The AI model is updateable by providing feedback and/or trusted data to continually train the AI model. In one embodiment, the AI learning model is a machine learning model configured to apply machine learning to classify the events, trends, etc. In another embodiment, the AI learning model is a deep learning model configured to apply deep learning to classify the events, trends, and the like, wherein machine learning is a sub-class of artificial intelligence, and deep learning is a sub-class of machine learning.

For example, the system 600 can be configured to monitor activity of components within a microservices architecture in order to provide input into the AI model 191 for learning relevant fingerprints, stacktrace signatures, code-path identifiers, requests, stacktraces, code-paths, component identification, negative events (e.g., errors, undetermined status, warnings, etc.), errors within code-paths and/or stacktraces, and the like that occur in a microservices architecture during a learning phase, and for classifying events, trends, and like based on the learned information. In particular, a plurality of fingerprints 610 may be collected from a telemetry service 230. Other relevant information may also be collected, including processing information, such as elapsed time for processing at a component, application versioning information, etc. Still other information may be collected from monitoring tools 270, such as information 670 relating to stacktraces, code-paths, code-path identifiers, stacktrace signatures, and the like.

As shown, the plurality of fingerprints 610 and other relevant information collected from the monitoring tools 270 are delivered to a feature extractor 620 that is configured to extract out the salient and/or relevant features from the fingerprints. As previously described, features may be fingerprints, stacktrace signatures, code-path identifiers, requests, stacktraces, code-paths, component identification, errors within code-paths and/or stacktraces, negative events (e.g., errors, underdetermined status, warnings, etc.), and the like that are associated with components in a microservices architecture that are involved in handling a plurality of requests.

Useful or learned features may be determined during a training phase of the AI model using artificial intelligence. In particular, the machine learning engine 190 (or a deep learning engine) and/or feature extractor 620 may be configured to define features that are associated with events, trends, and the like occurring within a microservices architecture. The training phase may use training data 630 generated during live game play (e.g., providing help sessions during live game play). Feature selection and/or extraction may also be performed to reduce the number of features for relevancy, accuracy, and efficiency when implementing the AI model 191. In some implementations, both feature definition and extraction is performed by the AI model 191, such that feature learning and extraction is performed internally within the AI model. Features are learned through input samples that are logically connected through hidden layers to an output during training of the AI model. Features that are found to be useful (e.g., learned) may be further broken down and analyzed to determine additional useful features (e.g., using feature construction techniques).

Relevant features from the plurality of fingerprints 610 and other relevant information collected from the monitoring tools 270 determined using the feature extractor 620 are provided as input to the machine learning engine 190. The machine learning system may be configured for training or implementation. Specifically, during the training phase, the AI model 191 (e.g., machine learning model) is trained using a training AI algorithm (e.g., machine learning or deep learning training algorithm) that is configured to classify events, trends, and the like occurring in a microservices architecture using training data (e.g., data 630). During an implementation phase, the AI model 191 classifies events, trends, and the like that occur in a microservices architecture based on the plurality of fingerprints 610 and other relevant information collected from the monitoring tools 270, as previously described.

As shown, the AI model 191 may be configured for a training phase (e.g., learning features and classifiers) (i.e., in a horizontal direction), or for an implementation phase (e.g., classifying player behavior) (i.e., in a vertical direction). During the training phase, training data 630 may be provided as input to the machine learning system 190, which implements a training algorithm to fit the structure of the AI model 191 to the training data by tweaking the parameters of the AI model, so that the trained AI model provides an accurate relationship between input (training and/or telemetry data) and output (classified data). Training and/or learning may be supervised using known and true outputs 635 (e.g., known events, trends, and the like occurring within a microservices architecture) associated with the training data 630, such as to learn the appropriate features. Training and/or learning may be unsupervised, wherein no known or true outputs are provided for the training data 630 (when used for training), such that input data is only provided and the AI model learns to identify the events, trends, etc., and/or to learn the associated features. Training may implement both supervised and unsupervised training. For example, after performing unsupervised training, supervised learning may be performed with known data. Training and implementation of the AI model 191 is further described below.

The machine learning engine 190 may be configured as a neural network used to train the AI model 191 through learning, in accordance with one embodiment of the disclosure. In one embodiment, machine learning engine 190 may be implemented to classify events, trends, and the like that occur within a microservices architecture. Specifically, machine learning engine 190 is configured to analyze training data 630 and/or other data during the training phase to build (e.g., train through learning) the AI model 191. As such, the training data 630 are fed to the machine learning engine 190, which utilizes artificial intelligence, including supervised learning algorithms, unsupervised learning algorithms, reinforcement learning, or other artificial intelligence-based algorithms to build the AI model 191 configured to classify the events, trends, and the like that occur within a microservices architecture.

The neural network in the machine learning engine 190 represents an example of an automated analysis tool for analyzing data sets to classify events, trends, and the like that occur within a microservices architecture. Different types of neural networks are possible for applying artificial intelligence. Though a machine learning engine applying machine learning is shown, it is understood that other AI techniques may be utilized, such as deep learning applied by a deep learning engine, in other embodiments. For example, the neural network supports machine learning that may be implemented by the machine learning engine 190. In another example, the neural network supports a deep learning network that may be implemented by deep learning engine, such as one set up as a Markov decision process (MDP) that supports a reinforcement learning algorithm. Accordingly, a deep neural network, a convolutional deep neural network, and/or a recurrent neural network using supervised or unsupervised training can be implemented.

Generally, the neural network in the machine learning engine 190 represents a network of interconnected nodes, such as an artificial neural network, and is used to train the AI model 191. Each node learns some information from data. Knowledge can be exchanged between the nodes through the interconnections. Input to the neural network of the machine learning engine 190 activates a set of nodes. In turn, this set of nodes activates other nodes, thereby propagating knowledge about the input. This activation process is repeated across other nodes until an output is provided.

As illustrated, the neural network implementing the AI model 191 includes a hierarchy of nodes. For example, within the layers 192 of the neural network there are input nodes receiving input information. Also, within the layers 192 are a set of output nodes, wherein an output node represents a decision (e.g., prediction) that relates to one or more components of an AI model 191, for example. As previously described, the output nodes may classify events, trends, and the like occurring within a microservices architecture. Results from the output nodes can be compared to predetermined and true results obtained from previous interactions with the microservices architecture, and the like, in order to refine and/or modify the parameters used by the machine learning engine 190 to iteratively determine the appropriate classification of events, trends, and the like that occur within a microservices architecture.

More particularly, hidden nodes may be provided within the layers of nodes 192, wherein the hidden nodes exist between the input nodes and output nodes. The hidden nodes may be interconnected to other hidden nodes forming layers of hidden nodes. Likewise, the hidden nodes are interconnected to the output nodes, such that the input nodes are not directly interconnected to the output nodes. As such, the input nodes are interconnected to corresponding hidden nodes, which may be interconnected to other hidden nodes (e.g., of another layer), and so on and so forth, until one or more hidden nodes are connected to one or more output nodes. An interconnection connects two nodes. The interconnection has a numerical weight that can be learned, rendering the neural network in the machine learning engine 190 (configured to build the AI model 191) adaptive to inputs and capable of learning.

Generally, the hidden nodes allows knowledge about the input nodes to be shared among all the tasks corresponding to the output nodes. To do so, a transformation $f$ is applied to the input nodes through the hidden nodes, in one implementation. In an example, the transformation $f$ is non-linear. Different non-linear transformations $f$ are available including, for instance, a linear rectifier function $f(x)=\max(0,x)$.

The neural network in the machine learning engine 190 configured to build the AI model 191 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network in the machine learning engine 190 configured to build the AI model 191 can be from a same data domain. For instance, the neural network is trained for learning the events, trends, and the like occurring within a microservices architecture for a given set of inputs or input data. For example, the data domain includes data related to game plays of video games and the support provided to the game plays considered as baseline input data. In another example, the training dataset is from different data domains to include input data other than baseline.

As such, the neural network in the machine learning engine 190 configured to build the AI model 191 may identify and/or classify events, trends, and the like occurring within a microservices architecture for a given set of inputs (e.g., training data). Based on these predictive results, the neural network 190 may also define an AI model 191 that is used to classify events, trends, and the like occurring within a microservices architecture using collected data (e.g., ongoing fingerprints and information from monitoring tools 270).

During an implementation phase (also referred to as generalization), the AI model 191 is used to predict and/or classify events, trends, and the like occurring within a microservices architecture from the fingerprints 610 and the information from the monitoring tools 270 (i.e., not training data) based on the configuration of the AI model. As such, for a given information that is provided as input to the feature extractor 620 and/or directly to the machine learning engine 190, events, trends, and the like occurring within a microservices architecture that is classified may be provided as an output from the AI model 191.

The classified events, ends, and the like occurring within a microservices architecture may be provided as feedback to the machine learning engine 190 to refine the AI model 191. For example, the classified events, ends, and the like occurring within a microservices architecture may be verified through any means. Verification may occur manually (e.g., through user input), or may be performed, at least in part, by the machine learning engine 190 through implementation of the AI model 191.

The verified event, trend, or the like occurring within a microservices architecture can be fed back to the machine learning engine. That is, information related to the classified event, trend, or the like may be sent to the feature identifier 640 in order to extract features related to the classified event, trend, or the like. In one implementation, those features were previously provided as input to the machine learning engine, and can be accessed or readily determined for purposes of training. In another implementation, those features may be newly determined. The identified features may be newly included within the training data 630, and provided as input into the machine learning engine for purposes of updating the AI model 191. Because the classified behavior (undesirable and/or desirable) is verified, the machine learning engine could apply a supervised learning algorithm by assigning the classified event, trend, or the like occurring within a microservices architecture as being a true output 635 when updating the AI model, in one embodiment.

By classifying and identifying events, trends, and the like occurring within a microservices architecture, additional system features or services may be supported. In particular, after classification of the events, trends, and the like occurring within a microservices architecture, action engine 650 is configured to take any additional action and/or perform a response to the classification. That is, action engine 650 may be configurable to perform any further action and/or response.

For example, the machine learning engine 190 may be configured to receive a plurality of fingerprints for a plurality of requests associated with a plurality of users (e.g., playing one or more video games). Each of the requests is associated with one or more transaction responses generated by one or more of the plurality of components of a microservices architecture for processing a corresponding request. The plurality of requests is associated with a plurality of request identifiers. As previously described, the transaction responses associated with processing the requests are associated with a plurality of processing information, which also may be provided to the machine learning engine 190. That is, other relevant information may be received, such as processing information including elapsed time for generating a transaction response at a corresponding component, an application version used by the component, etc. The machine learning engine 190 and AI model 191 are configured to determine and/or classify an event, trend, and the like that is associated with processing the plurality of requests based on the plurality of processing information. That is, the AI model 191 is configured to classify events, trends, and the like occurring with the microservices architecture.

Further, an action may be performed by the action engine 650 based on the classified event, trend, or the like occurring within the microservices architecture. For purposes of illustration, the classified event, trend, or the like may include an increased processing time at a component, and a decreased processing time at a component, and an increasing number of requests in the plurality of requests, and a decreasing number of requests in the plurality of requests, and a downtime at a component, etc. Once the event, trend, or the like occurring within the microservices architecture is classified, an appropriate action may be taken by the action engine 650. For example, in response to increasing or decreasing demand on one or more resources (e.g., components) of a microservices architecture, scaling of those resources may be performed.

In one embodiment, the AI model 191 may be configured to classify areas in a video game that is too difficult for players. In that manner, game developers may be able to generate a software patch that addresses the difficulty so that more players can successfully complete those areas. In other embodiments, the AI model may be configured to classify errors in the game code.

In still other embodiments, the AI model may be configured to monitor timing of components. For example, fingerprints that are related to similar requests may be analyzed to determine whether the microservices architecture is appropriate for handling those requests. Based on the information provided in FIG. 5, timing information related to processing time of components involved in handling a request associated with a request ID, or similar requests with similar request IDs, overall timing of handling the request and/or similar requests, time occurring between components (e.g., time spent sending data between components of a microservices architecture), and the like may be determined and analyzed. In that manner, based on timing information, it may be determined whether the configuration of the microservices architecture is sufficient to handle the requests made to a corresponding software based application that is implemented through the microservices architecture. For instance, if it takes too much time to return a final response to a request, then the microservices architecture may need to be modified or redesigned in order to speed up the response time.

Figure 7:
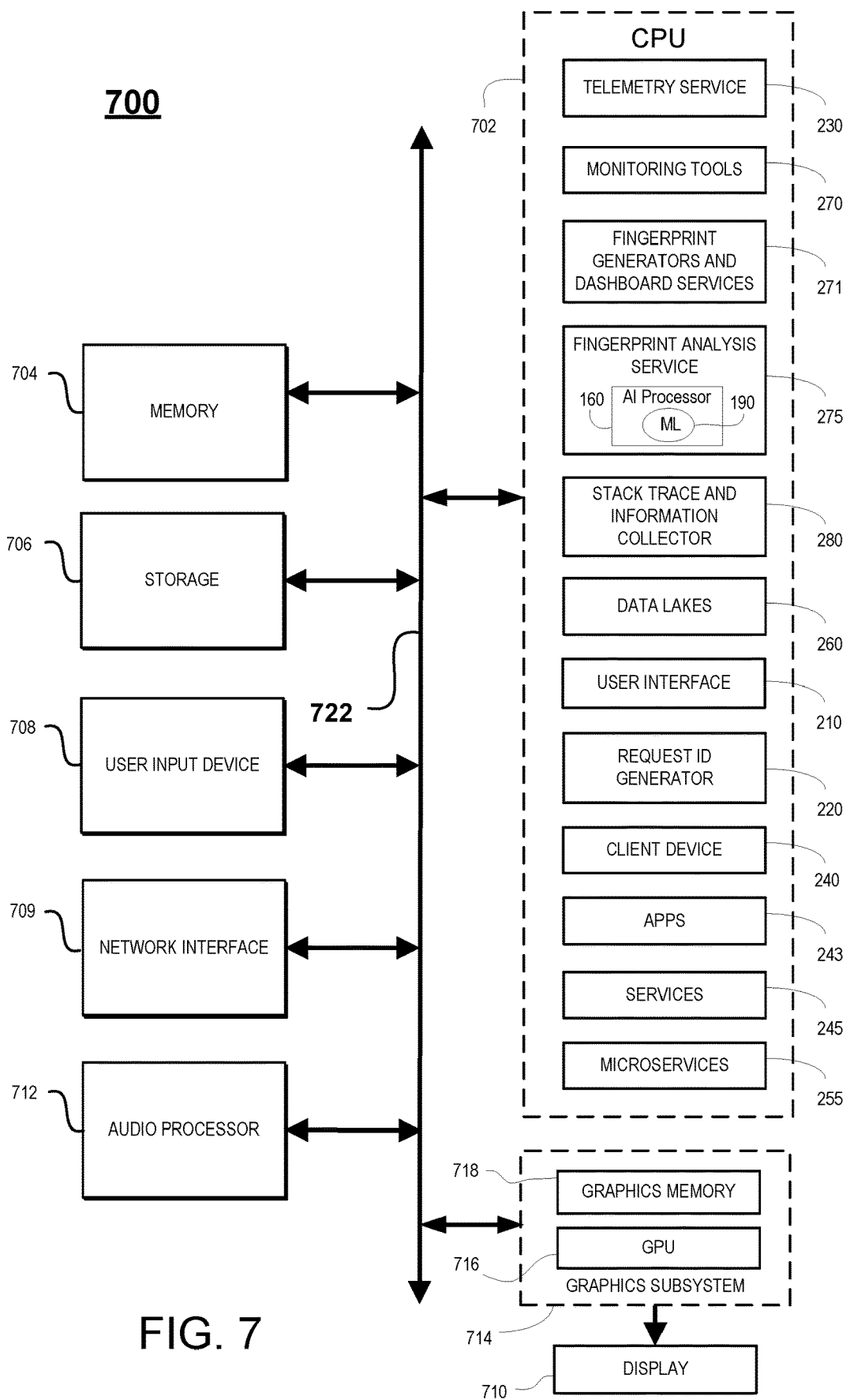
FIG. 7 illustrates components of an example device that can be used to perform aspects of the various embodiments of the present disclosure.

FIG. 7 illustrates components of an example device 700 that can be used to perform aspects of the various embodiments of the present disclosure. For example, FIG. 7 illustrates an exemplary hardware system suitable for generating a unique fingerprint for system interaction within a microservices architecture, and based on the information related to fingerprints for classifying events, trends, and the like occurring in a microservices architecture, in accordance with embodiments of the present disclosure. This block diagram illustrates a device 700 that can incorporate or can be a personal computer, a server computer, gaming console, mobile device, or other digital device, each of which is suitable for practicing an embodiment of the invention. Device 700 includes a central processing unit (CPU) 702 for running software applications and optionally an operating system. CPU 702 may be comprised of one or more homogeneous or heterogeneous processing cores.

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

CPU 702 may be configured to implement one or more functionalities. For example, CPU 702 may be configured to implement a telemetry service 230 configured to collect information related to routines performed by components involved in handling requests in a microservices architecture. CPU 702 may be configured to implement monitoring tools 270 configured for capturing log information related to the stacktraces and code-paths of components involved in handling requests in a microservices architecture. CPU 702 may be configured to implement a fingerprint generator/dashboard services component 271 configured to generate a fingerprint associated with components involved in handling a particular request through a microservices architecture, and for displaying information related to one or more fingerprints. CPU 702 may be configured to implement a fingerprint analysis service that may implement an AI processor 160 and machine learning engine 190 configured for analyzing one or more fingerprints of components involved in handling one or more requests in a microservices architecture. CPU 702 may be configured to implement a stacktrace and information collector that may be configured within the monitoring tools 270, and configured for capturing the stacktraces and/or code-paths, and other related information of corresponding components involved in handling one or more requests in a microservices architecture. CPU 702 may be configured to implement and/or manage one or more data lakes 260 that are configured to store information and/or perform other operations. CPU 702 may be configured to implement a user interface 210, such as one configured to receive a request for services from a service based application, and for displaying a result of that request (e.g., providing expert help to a request for assistance when playing a video game). CPU 702 may be configured to implement a request ID generator 220 that is configured to generate a unique identifier associated with a request for services from a software based application. CPU 702 may be configured to implement a client device for executing a video game, and/or communicating with a cloud game service that is executing a video game, among other functions. CPU 702 may be configured to implement one or more applications 243 involved in handling a request associated with a request ID through the microservices architecture. CPU 702 may be configured to implement one or more services 245 involved in handling a request associated with a request ID through the microservices architecture. CPU 702 may be configured to implement one or more microservices involved in handling a request associated with a request ID through the microservices architecture.

Memory 704 stores applications and data for use by the CPU 702 and GPU 716. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 709 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, graphics subsystem 714 including GPU 716, memory 704, data storage 706, user input devices 708, network interface 709, and audio processor 712 are connected via one or more data buses 722.

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs. In one embodiment, GPU 716 may be implemented within an AI engine (e.g., machine learning engine 190) to provide additional processing power, such as for the AI, machine learning functionality, or deep learning functionality, etc.

The graphics subsystem 714 periodically outputs pixel data for an image from graphics memory 718 to be displayed on display device 710, or to be projected by a projection system (not shown). Display device 710 can be any device capable of displaying visual information in response to a signal from the device 700, including CRT, LCD, plasma, and OLED displays. Device 700 can provide the display device 710 with an analog or digital signal, for example.

In other embodiments, the graphics subsystem 714 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for generating code-path identifiers and/or stacktrace signatures corresponding to code paths for each microservice used when responding to a request, wherein the identifiers and signatures are used to generate a fingerprint that further can be used to triage complex system integration issues.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
   receiving at a telemetry service a plurality of transaction responses from a plurality of components distributed across a network, wherein the plurality of transaction responses is generated to process a request originating from a source component, wherein the request includes a request identifier, wherein the plurality of transaction responses includes a plurality of code path identifiers;
   generating a fingerprint associated with the request by concatenating the plurality of code path identifiers, wherein each transaction response includes the request identifier and a corresponding code path identifier; and
   storing the fingerprint in a data storage,
   wherein a plurality of instructions in a corresponding stacktrace is executed at a corresponding component in association with each transaction response in the plurality of transaction responses,
   wherein the corresponding stacktrace is hashed to generate a corresponding code path identifier.

2. The method of claim 1, wherein the generating the fingerprint includes:
   concatenating the plurality of code path identifiers in order of receipt of each code path identifier.

3. The method of claim 1, further comprising:
   receiving a negative event associated with the request that is processed by the plurality of components;
   accessing via at least one monitoring tool a plurality of stacktraces associated with the plurality of code path identifiers, wherein the at least one monitoring tool collects each of the plurality of stacktraces from the plurality of components during generation of the plurality of transaction responses; and
   determining a stacktrace of a component that generated the negative event by parsing through the plurality of stacktraces.

4. The method of claim 1, further comprising:
   generating a plurality of fingerprints for a plurality of requests associated with a plurality of users, each of the plurality of requests being associated with one or more transaction responses generated by one or more of the plurality of components for processing a corresponding request, the plurality of requests being associated with a plurality of request identifiers;
   receiving a plurality of processing information with transaction responses used for processing the plurality of requests;
   determining a trend associated with the processing the plurality of requests based on the plurality of processing information; and
   performing an action based on the trend that is determined, wherein the plurality of fingerprints includes the fingerprint.

5. The method of claim 4, wherein the receiving the plurality of processing information includes:
receiving processing information with a transaction response from a component,
wherein the processing information includes at least one of:
an elapsed time for generating the transaction response by the component, and
an application version used by the component for processing the transaction response.

6. The method of claim 4,
wherein the plurality of requests from the plurality of users is related to a task to be performed in a video game,
wherein each of the plurality of fingerprints is similar.

7. The method of claim 4, wherein the determining the trend includes:
providing the plurality of fingerprints and the plurality of processing information to a machine learning engine to determine the trend.

8. The method of claim 1,
wherein a transaction response includes a code path identifier from a dependency component.

9. The method of claim 1, wherein the plurality of components includes:
a user interface as the source component, and
one or more applications at a client device that is local to a user or located at a back-end server, and
one or more services at the client device, and
one or more microservices located at one or more nodes of the network.

10. A computer system comprising:
a processor; and
memory coupled to the processor and having stored therein instructions that, if executed by the computer system, cause the computer system to execute a method comprising:
receiving at a telemetry service a plurality of transaction responses from a plurality of components distributed across a network, wherein the plurality of transaction responses is generated to process a request originating from a source component, wherein the request includes a request identifier, wherein the plurality of transaction responses includes a plurality of code path identifiers;
generating a fingerprint associated with the request by concatenating the plurality of code path identifiers, wherein each transaction response includes the request identifier and a corresponding code path identifier; and
storing the fingerprint in a data storage,
wherein in the method a plurality of instructions in a corresponding stacktrace is executed at a corresponding component in association with each transaction response in the plurality of transaction responses,
wherein in the method the corresponding stacktrace is hashed to generate a corresponding code path identifier.

11. The computer system of claim 10, wherein in the method the generating the fingerprint includes:
concatenating the plurality of code path identifiers in order of receipt of each code path identifier.

12. The computer system of claim 10, the method further comprising:

receiving a negative event associated with the request that is processed by the plurality of components;
accessing via at least one monitoring tool a plurality of stacktraces associated with the plurality of code path identifiers, wherein the at least one monitoring tool collects each of the plurality of stacktraces from the plurality of components during generation of the plurality of transaction responses; and
determining a stacktrace of a component that generated the negative event by parsing through the plurality of stacktraces.

13. A method, comprising:
receiving at a telemetry service a plurality of transaction responses from a plurality of components distributed across a network, wherein the plurality of transaction responses is generated to process a request originating from a source component, wherein the request includes a request identifier, wherein the plurality of transaction responses includes a plurality of code path identifiers;
generating a fingerprint associated with the request by concatenating the plurality of code path identifiers, wherein each transaction response includes the request identifier and a corresponding code path identifier; and
storing the fingerprint in a data storage,
wherein a transaction response includes a code path identifier from a dependency component.

14. The method of claim 13, wherein the generating the fingerprint includes:
concatenating the plurality of code path identifiers in order of receipt of each code path identifier.

15. The method of claim 13,
wherein a plurality of instructions in a corresponding stacktrace is executed at a corresponding component in association with the each transaction response in the plurality of transaction responses,
wherein the corresponding stacktrace is hashed to generate the corresponding code path identifier.

16. The method of claim 15, further comprising:
receiving a negative event associated with the request that is processed by the plurality of components;
accessing via at least one monitoring tool a plurality of stacktraces associated with the plurality of code path identifiers, wherein the at least one monitoring tool collects each of the plurality of stacktraces from the plurality of components during generation of the plurality of transaction responses; and
determining a stacktrace of a component that generated the negative event by parsing through the plurality of stacktraces.

17. The method of claim 13, further comprising:
generating a plurality of fingerprints for a plurality of requests associated with a plurality of users, each of the plurality of requests being associated with one or more transaction responses generated by one or more of the plurality of components for processing a corresponding request, the plurality of requests being associated with a plurality of request identifiers;
receiving a plurality of processing information with transaction responses used for processing the plurality of requests;
determining a trend associated with the processing the plurality of requests based on the plurality of processing information; and
performing an action based on the trend that is determined,
wherein the plurality of fingerprints includes the fingerprint.

18. The method of claim 17, wherein the receiving the plurality of processing information includes:
   receiving processing information with a transaction response from a component,
   wherein the processing information includes at least one of:
      an elapsed time for generating the transaction response by the component, and
      an application version used by the component for processing the transaction response.

19. The method of claim 17,
   wherein the plurality of requests from the plurality of users is related to a task to be performed in a video game,
      wherein each of the plurality of fingerprints is similar.

20. The method of claim 13, wherein the plurality of components includes:
   a user interface as the source component, and
   one or more applications at a client device that is local to a user or located at a back-end server, and
   one or more services at the client device, and
   one or more microservices located at one or more nodes of the network.

\* \* \* \* \*